United States Patent

Soga

(10) Patent No.: US 10,462,378 B2
(45) Date of Patent: Oct. 29, 2019

(54) IMAGING APPARATUS

(71) Applicant: Toyota Jidosha Kabushiki Kaisha, Toyota-shi, Aichi-ken (JP)

(72) Inventor: Mineki Soga, Nisshin (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/856,816

(22) Filed: Dec. 28, 2017

(65) Prior Publication Data

US 2018/0205863 A1 Jul. 19, 2018

(30) Foreign Application Priority Data

Jan. 17, 2017 (JP) .................. 2017-005692

(51) Int. Cl.
*H04N 5/235* (2006.01)
*G01C 21/36* (2006.01)
*G06K 9/00* (2006.01)
*G06K 9/62* (2006.01)
*H04N 5/238* (2006.01)

(52) U.S. Cl.
CPC ....... *H04N 5/2353* (2013.01); *G01C 21/3667* (2013.01); *G06K 9/00798* (2013.01); *G06K 9/00805* (2013.01); *G06K 9/6202* (2013.01); *H04N 5/238* (2013.01); *H04N 5/2351* (2013.01)

(58) Field of Classification Search
CPC .......... G01C 21/3667; G06K 9/00798; G06K 9/00805; G06K 9/6202; H04N 5/2353; H04N 5/2351; H04N 5/238
See application file for complete search history.

(56) References Cited

U.S. PATENT DOCUMENTS

2017/0195564 A1* 7/2017 Appia ................ H04N 5/23238

FOREIGN PATENT DOCUMENTS

| JP | H1066060 A | 3/1998 |
|----|------------|--------|
| JP | 2005326168 A | 11/2005 |
| JP | 2013160895 A | 8/2013 |
| JP | 2013168737 A | 8/2013 |
| WO | 2012086053 A1 | 6/2012 |

* cited by examiner

*Primary Examiner* — Huy T Nguyen

(74) *Attorney, Agent, or Firm* — Dinsmore & Shohl LLP

(57) ABSTRACT

An imaging apparatus is provided with an imager configured to image surroundings of a moving body, and configured to obtain a surrounding image; a position detector configured to detect a position of the moving body; a map device configured to store therein road map information; a setting device configured to estimate an area corresponding to a road in the obtained surrounding image on the basis of the detected position and the road map information, and configured to set a photometric area including at least a part of the estimated area; a calculator configured to calculate an exposure condition of said in on the basis of image information in the set photometric area in the obtained surrounding image; and a controller programmed to control said imager on the basis of the calculated exposure condition.

4 Claims, 3 Drawing Sheets

IMAGING APPARATUS

CROSS-REFERENCE TO RELATED APPLICATIONS

This application is based upon and claims the benefit of priority of the prior Japanese Patent Application No. 2017-005692, filed on Jan. 17, 2017, the entire contents of which are incorporated herein by reference.

BACKGROUND

1. Field

Embodiments of the present disclosure relate to an imaging apparatus, and particularly relate to an imaging apparatus that is mounted on a moving body, such as, for example, a vehicle, and that is configured to image surroundings of the moving body.

2. Description of the Related Art

For this type of apparatus, there is proposed, for example, an apparatus configured to change position coordinates of an image area, which is in an image photographed or imaged by an in-vehicle camera, on the basis of at least one of a change in position of the in-vehicle camera and a change in an optical axis direction of the in-vehicle camera if the image area includes a maladaptive area in which image processing cannot be performed due to overexposure or underexposure (refer to Japanese Patent Application Laid Open No. 2013-160895 (Patent Literature 1)). There is also proposed an apparatus that is configured to set a processing area in an image portion of a driving road surface between a host vehicle and an obstacle in an photographed image, in accordance with a position of the obstacle, a vehicle speed of the host vehicle, and a lane shape, and that is configured to calculate a next exposure amount of an imaging apparatus (refer to Japanese Patent Application Laid Open No. H10-066060 (Patent Literature 2)). There is also proposed an apparatus that is configured to set a first reference area in an imaging area of an imaging apparatus and that is configured to adjust an exposure amount of the imaging apparatus in accordance with luminance of the first reference area, wherein if an obstacle is detected in the first reference area, a second reference area is set to adjust the exposure amount of the imaging apparatus in accordance with luminance of the second reference area (refer to Japanese Patent Application Laid Open No. 2013-168737 (Patent Literature 3)).

This type of apparatus is often used to detect an obstacle, a lane, or the like, and it is desired to appropriately image a road surface. If an area expectedly including a road surface portion in a photographed image, like the first reference area in the Patent Literature 3, is set as a non-variable image area, then, for example, when a road has relatively large ups and downs, or when the road has a relatively complicated shape, an object other than a road surface (e.g. a building, a street tree, the sky, etc.) is included the image area, and exposure adjustment may not be appropriately performed. If an image area for the exposure adjustment is set on the basis of the position change and the optical axis direction change of the camera, as in a technique/technology described in the Patent Literature 1, or after the obstacle and the lane are detected, as in a technique/technology described in the Patent Literature 2, then, it possibly takes a relatively long time to obtain an appropriate exposure amount.

SUMMARY

In view of the aforementioned problems, it is therefore an object of embodiments of the present disclosure to provide an imaging apparatus configured to relatively quickly obtain an appropriate exposure condition.

The above object of embodiments of the present disclosure can be achieved by an imaging apparatus is provided with: an imager configured to image surroundings of a moving body, and configured to obtain a surrounding image; a position detector configured to detect a position of the moving body; a map device configured to store therein road map information; a setting device configured to estimate an area corresponding to a road in the obtained surrounding image on the basis of the detected position and the road map information, and configured to set a photometric area including at least a part of the estimated area; a calculator configured to calculate an exposure condition of said imager on the basis of image information in the set photometric area in the obtained surrounding image; and a controller programmed to control said imager on the basis of the calculated exposure condition.

On the imaging apparatus, an area corresponding to a road in a surrounding image is estimated on the basis of the position of the moving body and the road map information, and a photometric area is set. In other words, it is estimated how a road is photographed in a surrounding image, and a photometric area is set. According to the imaging apparatus, it is thus possible to relatively quickly obtain an appropriate exposure condition.

In one aspect of the imaging apparatus according to embodiments of the present disclosure, said imaging apparatus further comprises an optical axis estimator configured to estimate an optical axis direction of said imager, and said setting device is configured to estimate an area corresponding to a road in the obtained surrounding image on the basis of the detected position, the road map information, and the estimated optical axis direction, and is configured to set the photometric area.

A moving body does not always move in a road extending direction. Moreover, the optical axis direction of the imager varies depending on a direction of the moving body. For example, if the moving body vertically vibrates due to unevenness of a road, then, an area corresponding to a road in a surrounding image is also inclined to one of an upper side or a lower side. Moreover, if the optical axis direction of the imager is deviated from the road extending direction due to lane change or the like, then, the area corresponding to the road in the surrounding image may be inclined to one of a left side or a right side, in comparison with when the optical axis direction is in the road extending direction. In this aspect, the optical axis direction of the imager is estimated, and it is thus possible to increase accuracy of the estimation of the area corresponding to the road in the surrounding image. Therefore, according to the imaging apparatus, it is possible to relatively quickly obtain a more appropriate exposure condition.

In one aspect of the imaging apparatus according to embodiments of the present disclosure, the road map information includes: a plurality of points each of which indicates three-dimensional coordinates of each of a plurality of locations; and connection information about a connection between the plurality of points, and said setting device is configured to estimate an area corresponding to a road in the obtained surrounding image on the basis of the detected position and the road map information, and is configured to set the photometric area so as to include a part corresponding to a location separated from the detected position by a predetermined distance, out of the estimated area, with reference to the plurality of points and the connection information.

According to this aspect, it is possible to relatively quickly set an exposure condition appropriate for the imaging of a location separated from a position of the moving body by a predetermined distance. As a result, if the imaging apparatus is used to detect an obstacle on the basis of the imaged surrounding image, it is possible to relatively easily detect, for example, an obstacle that is at the location separated from the position of the moving body by the predetermined distance, from the surrounding image. The "predetermined distance" may be appropriately set in accordance with an imaging object (in other words, an object to be detected by using the surrounding image).

The nature, utility, and further features of this disclosure will be more clearly apparent from the following detailed description with reference to embodiments of the disclosure when read in conjunction with the accompanying drawings briefly described below.

DETAILED DESCRIPTION

An imaging apparatus according to embodiments of the present disclosure will be explained with reference to FIG. 1 to FIG. 4.

(Configuration of Apparatus)

Figure 1:
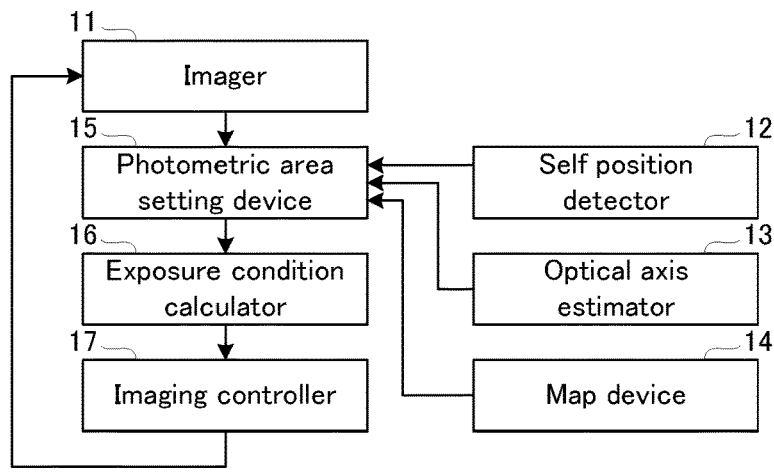
FIG. 1 is a block diagram illustrating a configuration of an imaging apparatus according to an embodiment.

A configuration of an imaging apparatus according to an embodiment will be explained with reference to FIG. 1. FIG. 1 is a block diagram illustrating the configuration of the imaging apparatus according to the embodiment.

An imaging apparatus 1 according to the embodiment is mounted on a not-illustrated moving body, such as, for example, an automatic four-wheel car and a motorcycle. In FIG. 1, the imaging apparatus 1 is provided with an imager 11, a self position detector 12, an optical axis estimator 13, a map device 14, a photometric area setting device 15, an exposure condition calculator 16, and an imaging controller 17.

The imager 11 is provided with an imaging element, such as, for example, a complementary metal oxide semiconductor (CMOS) and a charge coupled device (CCD). The imager 11 is configured to image surroundings of the moving body (or typically, an area ahead of the moving body) and to successively obtain a surrounding image.

The self position detector 12 is configured to receive, for example, a global positioning system (GPS) signal and to detect a position of the imaging apparatus 1, i.e. a position of the moving body on which the imaging apparatus 1 is mounted. It is desirable to increase accuracy of the detected position by matching map information and an output of a sensor mounted on the moving body. The position can be estimated, more accurately, for example, by converting an image obtained by the imager 11 to an overhead image, and by obtaining a position having the highest correlation with a road surface texture stored as the map information. The optical axis estimator 13 is configured to estimate a posture of the imaging apparatus 1, i.e. an optical axis direction, on the basis of e.g. an output of a gyro sensor.

The map device 14 is, for example, a map database, and is configured to store therein road map information. The road map information includes information indicating a road shape and a road slope, Specifically, the road, map information includes: a plurality of data points each of which indicates e.g. latitude, longitude, and altitude; and connection information indicating a road connecting the plurality of data points. The plurality of data points may include not only a data point corresponding to a node point, i.e. a node, such as, for example, an intersection, but also data points arranged at fixed intervals along a road or each lane.

The photometric area setting device 15 is configured to set a photometric area on the surrounding image captured by the imager 11, on the basis of the position of the imaging apparatus 1 detected by the self position detector 12, the optical axis direction of the imaging apparatus 1 detected by the optical axis estimator 13, and the road. map information. The "photometric area" may define an area for extracting image information (e.g. a luminance value) for setting an exposure condition of the imager 11.

The exposure condition calculator 16 is configured to calculate the exposure condition on the basis of the image information in the photometric area set by the photometric area setting device 15. A method of calculating the exposure condition will be described later. The imaging controller 17 is configured to control the imager 11 on the basis of the exposure condition calculated by the exposure condition calculator 16.

Now, a meaning of setting the "photometric area" will be explained. Brightness of a driving environment of the moving body varies in illuminance, by four or more orders of magnitude, from several ten lux (e.g. a headlight irradiation area at night) to about 100,000 lux (e.g. in the daytime on a sunny day). The illuminance varies by five to six orders of magnitude, in view of reflectance of various imaging objects, such as, for example, a road surface. For an apparatus configured to appropriately image this type of driving environment, there is a wide dynamic range camera. The wide dynamic range camera, however, may not be adopted as an imaging apparatus mounted on the moving body, for example, from the viewpoint of cost.

On the other hand, a relatively narrow dynamic range camera may hardly appropriately image the driving environment in some cases. If a bright spot and a dark spot, such as, for example, a half shade place and an inside and an outside of a tunnel, are photographed in one image, then, the bright spot may be overexposed, i.e. blown-out highlights, and the dark spot may be underexposed, i.e. blocked-up shadows. If a camera has an insufficient dynamic range with respect to a difference between brightness and darkness in an imaging range, i.e. an illuminance range, then, an exposure condition that covers the entire imaging range may not be appropriately set. Thus, in order that an imaging object (which is, for example, a road surface or an obstacle, in driving environment recognition) can be appropriately imaged, the exposure condition is dynamically set in accordance with the brightness of the imaging object. in order to appropriately set the exposure condition, the "photometric area" is set, because it is necessary to extract the image information about a portion in which an imaging object is photographed in an image.

(Exposure Adjustment Operation)

Next, an exposure adjustment operation on the imaging apparatus 1 as configured above will be explained with reference to flowcharts in FIG. 2 and FIG. 3.

Figure 2:
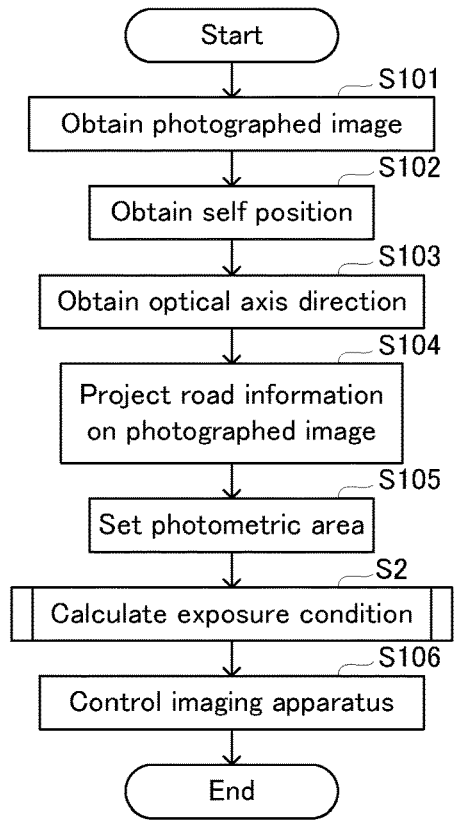
FIG. 2 is a flowchart illustrating an exposure adjustment operation according to the embodiment.

In FIG. 2, the imager 11 images the surroundings of the moving body and obtains a surrounding image (step S101). The self position detector 12 detects a position of the imaging apparatus 1 (step S102). The optical axis estimator 13 detects an optical axis direction of the imaging apparatus 1 (step S103). The step S101 to the step S103 are typically performed in parallel.

Then, the photometric area setting device 15 may extract the road map information about the surroundings of a current place of the moving body (or particularly the plurality of data points and the connection information) from the map device 14, on the basis of the position detected by the self position detector 12. The photometric area setting device 15 may reproduce a three-dimensional road shape from the extracted road map information. If there is a curve near the current place of the moving body, the photometric area setting device 15 may reproduce a curve road shape by using e.g. a B-spline curve, a clothoid curve, etc., on the basis of the plurality of data points included in the extracted road map information.

The photometric area setting device 15 projects or superimposes the reproduced three-dimensional road shape on the surrounding image, on the basis of an optical condition associated with the imaging apparatus 1, such as, for example, a focal point associated with the imager, a pixel pitch associated with the imaging element, and an optical axis direction of the imager 11 (step S104). The optical axis direction of the imager 11 may be obtained from the optical axis direction of the imaging apparatus 1 detected by the optical axis estimator 13. The photometric area setting device 15 then sets a photometric area so as to include at least a part of an area corresponding to a road in the surrounding image (hereinafter referred to as a "road part") (step S105).

Figure 4:
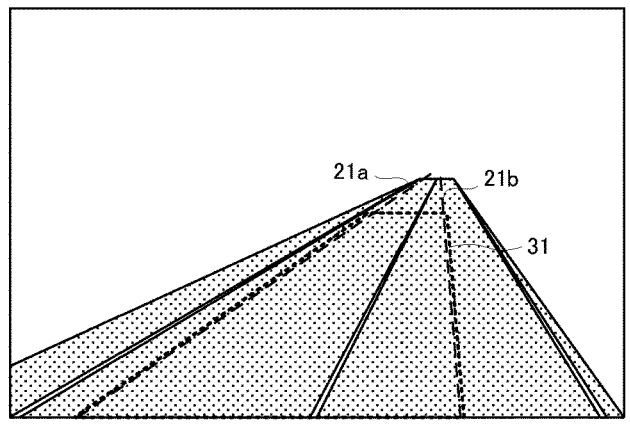
FIG. 4 is a diagram illustrating one example of a photometric area.

The photometric area will be specifically explained with reference to FIG. 4. In FIG. 4, dashed lines 21a and 21b indicate a three-dimensional road shape projected on the surrounding image (which are lines indicating lanes herein), and a dotted frame 31 indicates a photometric area. If a road surface is an imaging object, then, the photometric area setting device 15 refers to the projected three-dimensional road shape, and sets the photometric area 31 so as to include at least a part of the road part. FIG. 4 illustrates a straight road, and thus, the photometric area 31 is trapezoidal. The photometric area 31 is not limited to be trapezoidal but may adopt various shapes in accordance with the road shape.

The photometric area is generally set large, so that the exposure condition to be calculated is temporally stable. On the other hand, setting the large photometric area increases a possibility that an area other than the road part is included in the photometric area. Thus, a width of the photometric area 31, i.e. a length in a horizontal direction in FIG. 4, is desirably set to be narrower than a road width. By virtue of such a configuration, for example, if vibration of the moving body causes a deviation between the road part in the surrounding image and the projected three-dimensional road shape, it is possible to suppress that the photometric area 31 includes e.g. the sky, a building, etc.

Figure 3:
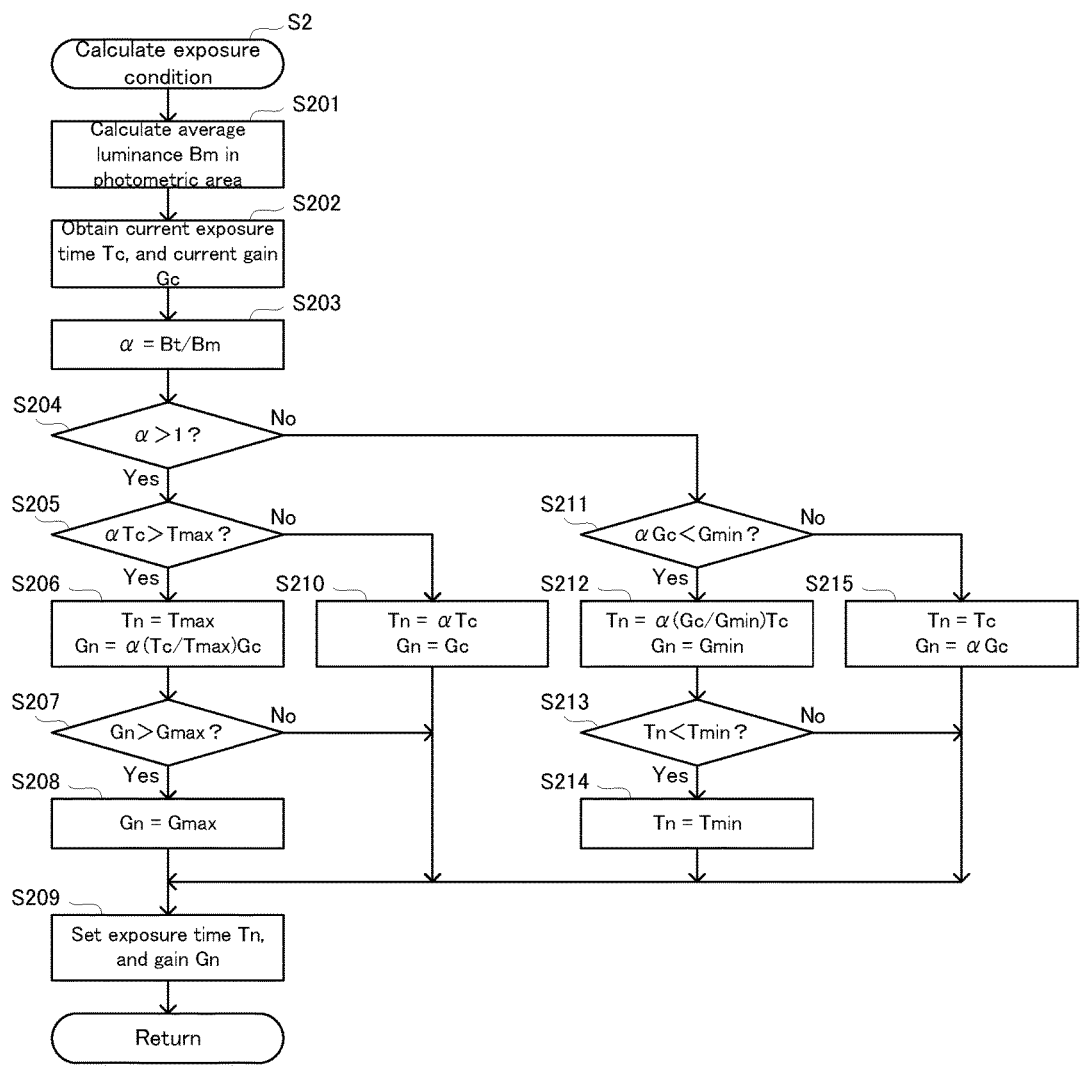
FIG. 3 is a flowchart illustrating an exposure condition calculation process according to the embodiment.

After the photometric area is set by the photometric area setting device 15, an exposure condition calculation process (S2) illustrated in FIG. 3 is performed. The exposure condition generally indicates a diaphragm value of a lens (or F value), an exposure time (or a shutter speed), and a gain (or ISO sensitivity). While the moving body travels, the brightness of the driving environment changes relatively frequently, and the diaphragm value of the lens is thus fixed in many cases. Even in the embodiment, the exposure condition is obtained while the diaphragm value of the lens is fixed. The diaphragm value of the lens, however, may be variable.

In FIG. 3, the exposure condition calculator 16 obtains, from the surrounding image, a luminance value of each of a plurality of pixels in the photometric area 31, and calculates an average luminance Bm (step S201). The luminance value is one example of the image information. In parallel with the step S201, the exposure condition calculator 16 obtains a current exposure time Tc and a current gain Gc of the imager 11 (step S202).

The exposure condition calculator 16 then obtains a ratio a between the average luminance Bm, and, a target luminance Bt (i.e. $\alpha=Bt/Bm$) (step S203). The exposure condition calculator 16 then determines whether or not the ratio $\alpha$ is greater than 1 (step S204). Here, "the ratio $\alpha$ is greater than 1" means that the target luminance Bt is brighter (or greater) than the average luminance Bm.

In the determination in the step S204, if it is determined that the ratio $\alpha$ is greater than 1 (the step S204: Yes), the exposure condition calculator 16 determines whether or not a product of the current exposure time Tc and the ratio $\alpha$, i.e. $\alpha Tc$, is greater than a maximum exposure time Tmax (step S205), in this determination, if it is determined that the product $\alpha Tc$ is greater than the maximum exposure time Tmax (the step S205: Yes), the exposure condition calculator 16 sets an exposure time Tn to the maximum exposure time Tmax, and sets a gain Gn to "$\alpha(Tc/Tmax)Gc$" (step S206).

The exposure condition calculator 16 then determines whether or not the gain Gn is greater than a maximum gain Gmax (step S207). In this determination, if it is determined that the gain Gn is less than or equal to the maximum gain Gmax (the step S207: No), a step S209 described later is performed.

On the other hand, in the determination in the step S207, if it is determined that the gain Gn is greater than the maximum gain Gmax (the step S207: Yes), the exposure condition calculator 16 sets the gain Gn to the maximum gain Gmax (step S208). The exposure condition calculator 16 then sets the exposure time Tn and the gain Gn as the exposure condition (step S209).

In the determination in the step S205, if it is determined that the product $\alpha Tc$ is less than or equal to the maximum exposure time Tmax (the step S205: No), the exposure condition calculator 16 sets the exposure time Tn to the product $\alpha Tc$, and sets the gain Gn to the current gain Gc (step S210). Then, the step S209 is performed.

In the determination in the step S204, if it is determined that the ratio $\alpha$ is less than or equal to 1 (the step S204: No), the exposure condition calculator 16 determines whether or not a product of the current gain Gc and the ratio $\alpha$, i.e. $\alpha Gc$, is less than a minimum gain Gmin (step S211). In this determination, if it is determined that the product $\alpha Gc$ is less than the minimum gain Gmin (the step S211: Yes), the exposure condition calculator 16 sets the exposure time Tn to "$\alpha(Gc/Gmin)Tc$", and sets the gain Gn to the minimum gain Gmin (step S212).

The exposure condition calculator 16 then determines whether or not the exposure time Tn is less than a minimum exposure time Tmin (step S213). In this determination, if it is determined that the exposure time Tn is greater than or equal to the minimum exposure time Tmin (the step S213: No), the step S209 is performed.

On the other hand, in the determination in the step S213, if it is determined that the exposure time Tn is less than the minimum exposure time Tmin (the step S213: Yes), the exposure condition calculator 16 sets the exposure time Tn to the minimum exposure time Tmin (step S214). Then, the step S209 is performed.

In the determination in the step S211, if it is determined that the product αGc is greater than or equal to the minimum gain Gmin (the step S211: No), the exposure condition calculator 16 sets the exposure time Tn to the current exposure time Tc, and sets the gain Gn to the product αGc (step S215). Then, the step S209 is performed.

The maximum exposure time Tmax may be set in view of e.g. an inter-frame time (e.g. 33 milliseconds case of 30 fps) and a motion blur. The minimum exposure time Tmin may be defined by e.g. a clock frequency of a circuit used in the imager 11, or the like. The maximum gain Gmax may be set, for example, as a maximum allowable value of noise included in a signal outputted from the imaging element. The minimum gain Gmin is typically "1".

Back in FIG. 2 again, the imaging controller 17 controls the imager 11 on the basis of the exposure time Tn and the gain Gn, which are set by the exposure condition calculator 16 (step S106). After a lapse of a predetermined time from the step S106, the step S101 is performed again. In general, the step S101 to the step S106 are repeated for each image obtained by the imager 11.

(Technical Effect)

On the imaging apparatus 1, the photometric area is set to include at least a part of the road part in the surrounding image by using the road map information or the like, and the exposure condition is calculated on the basis of the image information (e.g. the luminance value) in the set photometric area. Thus, according to the imaging apparatus 1, it is possible to relatively quickly obtain the exposure condition appropriate for the imaging of the imaging object (e.g. a road surface and an obstacle on the road surface).

The "self position detector 12", the "photometric area setting device 15", the "exposure condition calculator 16" and the "imaging controller 17" according to the embodiment are respectively one example of the "position detector", the "setting device", the "calculator", and the "controller" according to embodiments of the present disclosure.

<First Modified Example>

Figure 5:
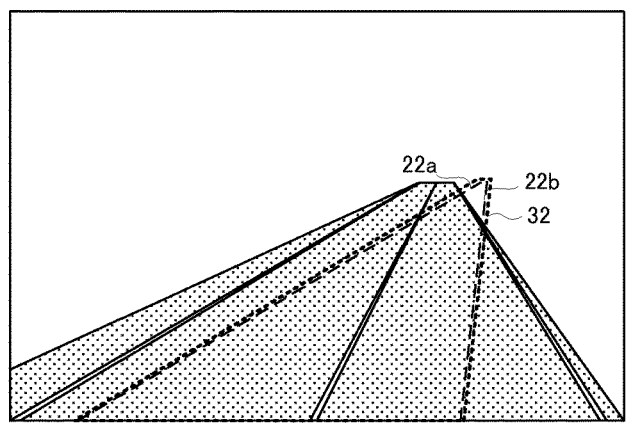
FIG. 5 is a diagram illustrating another example of the photometric area.

In the aforementioned embodiment, when the three-dimensional road shape is projected on the surrounding image, the optical axis direction of the imager 11 is taken into account. In a first modified example, the photometric area setting device 15 is configured to project the three-dimensional road shape on the surrounding image, on the assumption that the optical axis direction of the imager 11 is parallel to a road extending direction. In the first modified example, the three-dimensional road shape projected on the surrounding image (refer to dashed lines 22a and 22b) is deviated from the road part in the surrounding image in some cases, for example, as illustrated in FIG. 5, but the photometric area (which is a dotted frame 32 in FIG. 5) can be set, substantially appropriately; which has been found from studies by the present inventors. In the first modified example, the optical axis estimator 13 may not be an essential component. It is thus possible to achieve a reduction in manufacturing cost, miniaturization of an apparatus, or the like.

<Second Modified Example>

The photometric area setting device 15 may set the photometric area in the following manner. The photometric area setting device 15 is configured to extract a first data point, which is the closest to the current place of the imaging apparatus 1 detected by the self position detector 12, from the plurality of data point included in the road map information, which are one example of the "plurality of points" according to embodiments of the present disclosure, and is configured to obtain a second data point, which is connected to the first data point and which is the closest to a location separated from the first data point by a predetermined distance.

Figure 6:
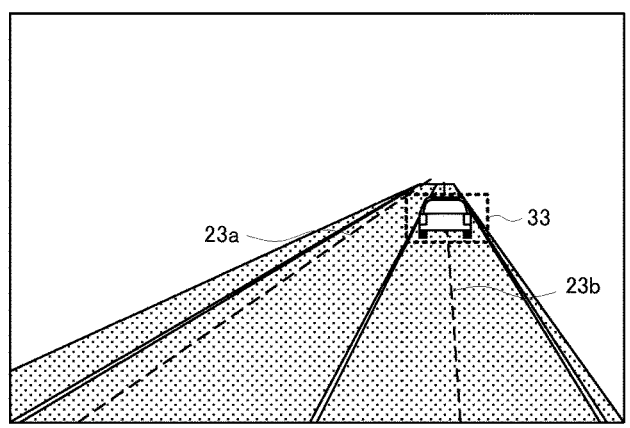
FIG. 6 is a diagram illustrating another example of the photometric area.

The photometric area setting device 15 is configured to set, as the photometric area, an area (refer to a dotted frame 33 in FIG. 6) in the surrounding image corresponding to a predetermined size (e.g. 4 meter wide, 3 meter high) at a location separated from the imaging apparatus 1 by the predetermined distance, in such a manner that a pixel of the surrounding image corresponding to a location indicated by the second data point is a center of a base of the photometric area. The "pixel of the surrounding image corresponding to the location indicated by the second data point" may be obtained on the basis of the optical condition associated with the imaging apparatus 1, when the three-dimensional road shape (which are lanes indicated by dashed lines 23a and 23b in FIG. 6) is projected on the surrounding image, in the aforementioned step S104.

By virtue of such a configuration, it is possible to relatively quickly set the exposure condition appropriate for the imaging of the location separated from the position of the imaging apparatus 1 (i.e. the position of the moving body) by the predetermined distance. As a result, when the imaging apparatus 1 is used to detect an obstacle, an obstacle that exists at the location separated from the position of the moving body by the predetermined distance (which is a vehicle in FIG. 6) can be robustly detected from the surrounding image, against brightness variation. Each of the "predetermined distance" and the "predetermined size" may be appropriately set in accordance with the imaging object (or a detection object).

<Third Modified Example>

The range of the ratio a in the flowchart illustrated in FIG. 3 may be limited, for example, to 0.8 to 1.2. By virtue of such a configuration, it is possible to suppress an abrupt change in brightness between temporally continuous frame images. Alternatively, if the α obtained in the step S203 in FIG. 3 has e.g. a range of 0.9 to 1.1, a current exposure condition may be maintained. By virtue of such a configuration, it is possible to prevent frequent changes in brightness, or a so-called hunting phenomenon, if the average luminance Bm is close to the target luminance Bt.

In the flowchart illustrated in FIG. 3, the luminance value is exemplified as the image information; however, any of a R value, a G value, and a B value may be used instead of the luminance value. If the imager 11 is a Bayer camera, a pixel value of a color image or of a RAW image before luminance image conversion may be regarded as the luminance value.

In the flowchart illustrated in FIG. 3, such an exposure condition that the average luminance Bm approaches the target luminance Bt is obtained; however, it is also possible to obtain, for example, such an exposure condition that a total of overexposure pixels and underexposure pixels is the minimum in the photometric area.

The disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come within the meaning and range of equivalency of the claims are therefore intended to be embraced therein.

What is claimed is:

1. An imaging apparatus comprising:
an imager configured to image surroundings of a moving body, and configured to obtain a surrounding image;
a position detector configured to detect a position of the moving body;
a map device configured to store therein road map information;
a setting device configured to estimate an area corresponding to a road in the obtained surrounding image on the basis of the detected position and the road map information, and configured to set a photometric area including at least a part of the estimated area;
a calculator configured to calculate an exposure condition of said imager on the basis of image information in the set photometric area in the obtained surrounding image; and
a controller programmed to control said imager on the basis of the calculated exposure condition.

2. The imaging apparatus according to claim 1, wherein said imaging apparatus further comprises an optical axis estimator configured to estimate an optical axis direction of said imager, and
said setting device is configured to estimate an area corresponding to a read in the obtained surrounding image on the basis of the detected position, the road map information, and the estimated optical axis direction, and is configured to set the photometric area.

3. The imaging apparatus according to claim 1, wherein the road map information includes: a plurality of points each of which indicates three-dimensional coordinates of each of a plurality of locations; and connection information about a connection between the plurality of points, and
said setting device is configured to estimate an area corresponding to a road in the obtained surrounding image on the basis of the detected position and the road map information, and is configured to set the photometric area so as to include a part corresponding to a location separated from the detected position by a predetermined distance, out of the estimated area, with reference to the plurality of points and the connection information.

4. The imaging apparatus according to claim 2, wherein the road map information includes: a plurality of points each of which indicates three-dimensional coordinates of each of a plurality of locations; and connection information about a connection between the plurality of points, and
said setting device is configured to estimate an area corresponding to a road in the obtained surrounding image on the basis of the detected position and the road map information, and is configured to set the photometric area so as to include a part corresponding to a location separated from the detected position by a predetermined distance, out of the estimated area, with reference to the plurality of points and the connection information.

* * * * *

UNITED STATES PATENT AND TRADEMARK OFFICE
CERTIFICATE OF CORRECTION

PATENT NO. : 10,462,378 B2
APPLICATION NO. : 15/856816
DATED : October 29, 2019
INVENTOR(S) : Mineki Soga It is certified that error appears in the above-identified patent and that said Letters Patent is hereby corrected as shown below:

On the Title Page

Item (57), abstract, Line 1, after "with", insert --:--.

Item (57), abstract, Line 11, after "said", delete "in" and insert --imager--, therefor.

In the Specification

In Column 3, Line 45, delete "not-illustrated" and insert --not illustrated--, therefor.

In Column 4, Line 22, after "road", delete ".".

In Column 4, Line 63, after "object.", delete "in" and insert --In--, therefor.

In Column 6, Line 17, after "ratio", delete "a" and insert --α--, therefor.

In Column 6, Line 17, delete "Bm, and," and insert --Bm and--, therefor.

In Column 6, Line 28, delete "S205), in" and insert --S205). In--, therefor.

In Column 6, Line 60, delete "α(Gc/Grain)Tc" and insert --α(Gc/Gmin)Tc--, therefor.

In Column 7, Line 39, after "calculator 16'", insert --,--.

In Column 7, Line 58, after "appropriately", delete ";" and insert --,--, therefor.

In Column 8, Line 40, after "ratio", delete "a" and insert --α--, therefor.

Signed and Sealed this
Eleventh Day of February, 2020

Andrei Iancu
*Director of the United States Patent and Trademark Office*

In the Claims

In Column 9, Claim 2, Line 28, delete "read" and insert --road--, therefor.